US012337340B2

(12) United States Patent
Detzel

(10) Patent No.: US 12,337,340 B2
(45) Date of Patent: Jun. 24, 2025

(54) SEAL COAT MASKING SHIELD AND RELATED METHODS

(71) Applicant: Robert Detzel, Covington, KY (US)

(72) Inventor: Robert Detzel, Covington, KY (US)

( * ) Notice: Subject to any disclaimer, the term of this patent is extended or adjusted under 35 U.S.C. 154(b) by 835 days.

(21) Appl. No.: 17/378,276

(22) Filed: Jul. 16, 2021

(65) Prior Publication Data

US 2023/0012603 A1 Jan. 19, 2023

(51) Int. Cl.

| | |
|---|---|
| ***B05B 12/24*** | (2018.01) |
| ***B05B 12/20*** | (2018.01) |
| ***B05B 12/32*** | (2018.01) |
| ***B05B 12/36*** | (2018.01) |
| ***E01C 19/17*** | (2006.01) |
| ***E01C 23/22*** | (2006.01) |

(52) U.S. Cl.

CPC .............. *B05B 12/36* (2018.02); *B05B 12/24* (2018.02); *B05B 12/29* (2018.02); *B05B 12/32* (2018.02); *E01C 23/22* (2013.01); *E01C 19/17* (2013.01)

(58) Field of Classification Search

None

See application file for complete search history.

(56) References Cited

U.S. PATENT DOCUMENTS

| | | | | |
|---|---|---|---|---|
| 1,817,928 A | | 8/1931 | Panitzsch | |
| 2,319,664 A | | 5/1943 | Davis et al. | |
| 4,248,914 A | * | 2/1981 | McClane | B05B 12/28 118/504 |
| 4,325,323 A | | 4/1982 | Rioux | |
| 4,921,028 A | * | 5/1990 | Schwartz | B05B 12/24 16/DIG. 30 |
| 4,951,875 A | * | 8/1990 | Devey | B05B 12/34 239/104 |
| 5,109,793 A | | 5/1992 | Ballejos | |
| 5,549,457 A | | 8/1996 | Flores et al. | |
| 5,853,811 A | | 12/1998 | Poague | |
| 2008/0092810 A1 | * | 4/2008 | Kim | B05B 12/36 118/301 |
| 2010/0126416 A1 | * | 5/2010 | Gringer | B05B 12/28 118/504 |
| 2013/0008620 A1 | * | 1/2013 | Cusick | B05B 12/24 160/372 |
| 2014/0069332 A1 | * | 3/2014 | DeMott, III | B05B 14/00 118/504 |
| 2014/0069333 A1 | * | 3/2014 | Van'T Hof | B05C 21/005 118/505 |
| 2014/0209019 A1 | * | 7/2014 | Ruha | B05B 12/28 164/113 |
| 2017/0066007 A1 | * | 3/2017 | Brown | B05C 21/005 |

(Continued)

FOREIGN PATENT DOCUMENTS

GB 2150861 A 7/1985

*Primary Examiner* — Binu Thomas

(74) *Attorney, Agent, or Firm* — Wood Herron & Evans LLP

(57) ABSTRACT

A masking shield for shielding a surface during a traffic surface treatment process during which a mechanical sprayer having a spray wand is used to spray a protective sealant on the traffic surface, the masking shield having a frame with a generally rectangular shape and having a first side and a second side. The masking shield further having a thin, flexible liner in the form of a sleeve, the sleeve configured to completely receive the frame, and a runner removably coupled to a bottom edge of the frame.

19 Claims, 7 Drawing Sheets

(56) References Cited

U.S. PATENT DOCUMENTS

| | | | | |
|---|---|---|---|---|
| 2020/0146216 | A1 * | 5/2020 | Landry .................. | A01G 3/062 |
| 2021/0299693 | A1 * | 9/2021 | Cavaness ................ | B05B 12/32 |
| 2022/0080443 | A1 * | 3/2022 | Ranweiler ............... | B05B 12/32 |

* cited by examiner

SEAL COAT MASKING SHIELD AND RELATED METHODS

FIELD OF THE INVENTION

The invention is directed generally to masking or spray shields and specifically to a shield for preventing the spraying of a sealant onto an object during a traffic surface treatment process.

BACKGROUND OF THE INVENTION

Parking lots and other similar traffic surfaces are often subject to excessive wear and exposure to the elements. To prevent deterioration, such surfaces are often coated with a protective sealant after a certain amount of use and wear. For example, blacktop sealant is commonly applied to a parking lot surface to restore the surface to a more desirable condition and to extend its useful life. The blacktop sealant is typically a coal tar material that must be spread in a thin layer over the parking lot surface. Because the tar material is very difficult to remove from a surface once it is applied, great care must be taken to ensure that the blacktop sealant is only applied to the desired parking lot surface and not to other objects and/or surfaces near the parking lot surface. More particularly, care must be taken to avoid application of the sealant to finished surfaces such as perimeter curbs, concrete bumpers, sidewalks, planter boxes, sign poles, and other objects located on or around the parking lot surface. As may be appreciated, coating these objects in the typically black sealant usually results in an undesirable appearance.

The most common method for coating parking lot surfaces with sealant is to use a mechanical spraying device. The spraying device is typically connected to a tank for storing and mixing the black top sealant, and includes a spray wand and numerous other components to help ensure the sealant is evenly applied to the parking lot surface. In order to avoid coating the finished surfaces of perimeter curbs, sidewalks, and the like, these surfaces are typically covered with sheets of cardboard, plywood, or other like material before the black top sealant is applied to the parking lot. This method of shielding finished surfaces from sealant is not only time-consuming, but requires a substantial amount of extra material for each job site that must be transported between jobs or disposed of after the completion of a job. Furthermore, this method is messy as the material has to be pulled off the covered surfaces once the parking lot is covered in sealant. This can lead to the undesirable transfer of any uncured sealant from the protective material to the covered surfaces.

Alternatively, another method for protecting finished surfaces is to apply a four to five foot boarder of sealant around the perimeter of the parking lot by hand instead of using a mechanical sprayer. For this method, workers typically use brooms, squeegees, or other special equipment to carefully and precisely coat a portion of the parking lot near the perimeter curb or other finished surfaces. This method eliminates the need for spraying sealant near the perimeter curb thereby eliminating the possibility of any overspray onto the curb, for example. However, this technique significantly slows down to the coating process and also results in more pieces of equipment that must be transported between job sites and cleaned after use.

The methods discussed above for preventing overspray of sealant onto an object or finished surface such as a perimeter curb, for example, are labor-intensive, time-consuming, and costly. Therefore, there is a need for an improved method for applying protective coatings to a parking lot or other traffic surface. More particularly, it is desirable to complete such a task in a more timely, convenient, and economically efficient manner. Thus, it would be desirable to provide a method and apparatus for protecting a finished surface or object during application of a protective sealant to a parking lot or other traffic surface using a mechanical sprayer.

SUMMARY OF THE INVENTION

Certain exemplary aspects of the present invention are set forth below. It should be understood that these aspects are presented merely to provide the reader with a brief summary of certain forms the present invention might take and that these aspects are not intended to limit the scope of the present invention. Indeed, the present invention may encompass a variety of aspects that may not be explicitly set forth below.

The present invention achieves the above-described needs by providing a masking shield for shielding a surface during a traffic surface treatment process during which a mechanical sprayer having a spray wand is used to spray a protective sealant on the traffic surface. The masking shield includes a frame, having a generally rectangular shape and with a first side and a second side. The masking shield further includes a thin, flexible liner in the form of a sleeve, the sleeve configured to completely receive the frame, and a runner removably coupled to a bottom edge of the frame. In one embodiment, the liner is a disposable liner. In another embodiment, the masking shield includes a plurality of clips for securing the liner to the frame.

In another embodiment, the runner is rectangular in shape and extends a length of the frame and further extends a distance from the bottom edge of the frame. The runner may also include one or more clips for coupling the runner to the bottom edge of the frame. In one embodiment, the runner may be removably coupled to the frame using one or more nut and bolt combinations.

In another embodiment, the masking shield further comprises a tether with a first end coupled to the frame and a second end being configured to couple to the spray wand such that a spray nozzle of the spray wand is permitted to move freely within a movement area relative to the frame. In this embodiment, the spray nozzle is prevented from moving out of the movement area by a length of the tether. In one embodiment, the tether is removably attached to the frame. The tether may be attached to a horizontal member of the frame. In another embodiment, the tether is located on the first side of the frame. The tether may be a chain, for example.

In one embodiment, the movement area is located adjacent to the first side of the frame. Further, the movement area may be a dome-shaped sphere.

In one embodiment, the masking shield includes a handle positioned on the second side of the frame. The handle may extend between a first vertical member and a second vertical member of the frame.

In another embodiment, the masking shield includes a first wheel and a second wheel located on the second side of the frame. In other embodiments, the first wheel is mounted to a first vertical member of the frame and the second wheel is mounted to a second vertical member of the frame.

According to any embodiment, the frame of the masking shield includes a first half removably coupled to a second half at a first joint located along a first horizontal member and at a second joint located along a second horizontal member.

According to another aspect of the invention, a masking shield is provided including a frame, having a generally rectangular shape and having a first side and a second side, a thin, flexible liner in the form of a sleeve, the sleeve configured to completely receive the frame, and a runner removably coupled to a bottom edge of the frame.

In one embodiment, the masking shield further comprises a tether having a first end coupled to the frame and a second end being configured to couple to a spray wand that is used to apply a protective coating to the traffic surface during the traffic surface treatment process such that a spray nozzle of the spray wand is permitted to move freely within a movement area relative to the frame, wherein the spray nozzle is prevented from moving out of the movement area by a length of the tether.

According to yet another aspect of the invention, a method of shielding a surface during a traffic surface treatment process wherein a mechanical spraying device having a spray wand is used to apply a protective sealant to the traffic surface, comprises providing a masking shield having a frame received within a liner and a tether with a first end coupled to the frame and a second end coupled to the spray wand of the mechanical spraying device and a runner coupled to the bottom of the frame. The method further includes aligning the runner with an edge of the traffic surface such that the traffic surface is positioned on a first side of the frame and the surface is positioned on a second side of the frame. Next, spacing the spray wand away from the first side of the frame and over the traffic surface, and then moving the masking shield along the traffic surface in unison with the spray wand thereby shielding the surface as the protective sealant is applied to the traffic surface with the spray wand.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION

The following description is of the best mode presently contemplated for the carrying out of the invention. This description is made for the purpose of illustrating the general principles of the invention and is not to be taken in a limiting sense. The scope of the invention is best determined by reference to the appended claims.

Various non-limiting embodiments will now be described to provide an overall understanding of the principles of the structure, function, and use of the masking shield disclosed herein. One or more examples of these non-limiting embodiments are illustrated in the accompanying drawings. Those of ordinary skill in the art will understand that apparatus and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Figure 1:
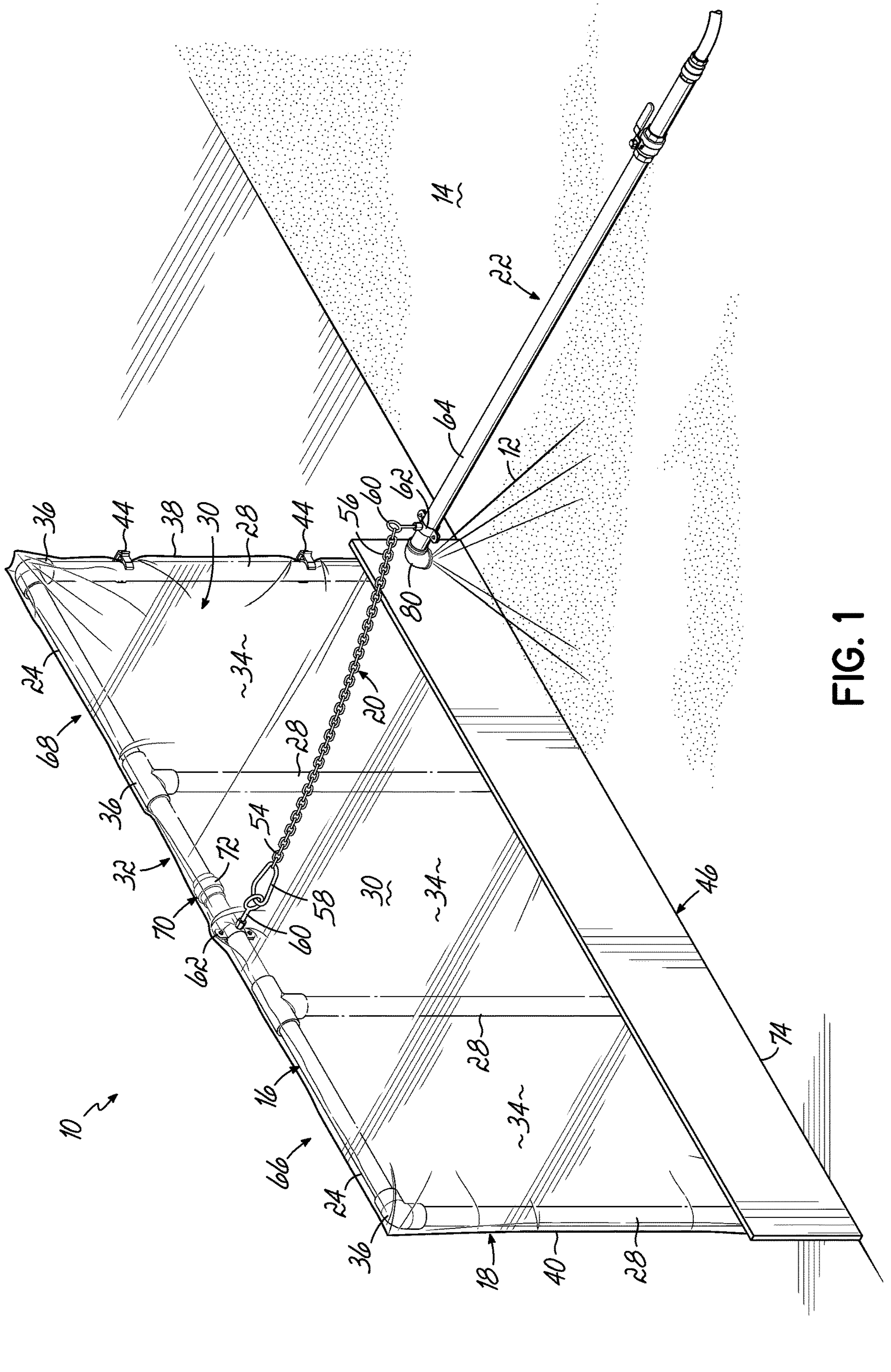
FIG. 1 is a perspective view illustrating a spray wand coupled to a masking shield according to the invention.

With reference to FIG. 1, an exemplary masking shield 10 according to one embodiment of the present invention is illustrated. The masking shield 10 may be used during a traffic surface treatment process where a protective sealant 12 is applied to a traffic surface 14 with a mechanical sprayer. More particularly, the masking shield 10 may be used to shield an object or surface near, or adjacent to, the traffic surface 14 from sealant 12 overspray during the traffic surface treatment process. Examples of objects and surfaces desirable to protect from sealant 12 overspray include a perimeter curb, sidewalk, bumper block, planter boxes, sign poles, and other like objects and/or surfaces located adjacent to the traffic surface 14. By adjacent, it is meant that the object or surface to be protected is next to the traffic surface 14, such as a curb located around the perimeter, a planter box spaced a distance away from the traffic surface 14, or a sidewalk that extends alongside or away from the traffic surface 14, for example. Adjacent may also mean that the surface or object to be protected is disposed on the traffic surface 14 such as a walkway or sidewalk, a bumper block, sign pole, or other like structure or surface, for example.

While the invention will be described herein in connection with shielding a finished curb from sealant 12, it will be understood that the invention is not limited to this embodiment. Rather, the principles of the invention described herein, in its broader aspects, are applicable to all types of surfaces and objects that may be desirable to protect from sealant 12 overspray during a traffic surface treatment process. Moreover, the masking shield 10 may be used during other types of surface treatment processes involving the use of a mechanical sprayer for spraying a sealant or coating of material onto a surface, such as a synthetic floor treatment process, for example.

With continued reference to FIG. 1, the exemplary masking shield 10 includes a frame 16 configured to be received within a liner 18. The frame 16 further includes a runner 46 that is removably attached to the frame 16 and a tether 20 configured to operatively couple a spray wand 22 of the mechanical spray device (not shown) to the frame 16, as will be described in further detail below. The frame 16 includes a first horizontal member 24, a second horizontal member 26, and a plurality of vertical members 28 attached to and extending between the first and second horizontal members 24, 26 to form the frame 16. In this regard, the frame 16 is a generally planar structure, generally rectangular in shape, having a first side 30 and an opposite second side 32. The frame 16 further includes a plurality of openings or voids 34 extending between the first side 30 and second side 32 of the frame 16, and also between the interconnected horizontal and vertical members 24, 26, 28. In the exemplary embodiment shown, there are three voids 34, however, there may be fewer or more voids 34 as desired, depending on how long the frame 16 is and its structural requirements. As shown, the voids 34 occupy a majority of the surface area defined by the frame 16. As a result, the voids 34 reduce the weight of the frame 16 thereby making the masking shield 10 easier to maneuver during use.

In one embodiment, the first horizontal member 24, second horizontal member 26, and plurality of vertical members 28 are formed from polyvinyl chloride (PVC) piping. For example, the members 24, 26, 28 may be schedule 80 PVC piping. In the embodiment shown, the members 24, 26, 28 may be joined together with one or more fittings 36 such as 90 degree PVC elbows and PVC tee sockets to form the frame 16, for example. To this end, the first horizontal member 24, second horizontal member 26, and plurality of vertical members 28 may each be formed from a single piece of PVC piping or from multiple pieces of PVC piping coupled together with fittings. However, the frame members 24, 26, 28 may be formed from other types of extruded synthetic plastic materials and it will be understood that the invention is not limited to the materials described above. In one embodiment, the frame members 24, 26, 28 may be extruded metal tubing formed from any one of aluminum, titanium, or any type of steel, for example. Furthermore, the frame members 24, 26, 28 may have other polygonal or round cross-sectional shapes, such as square, for example.

With continued reference to FIG. 1, to shield a surface or object that is desirable to protect from sealant 12 overspray during the traffic surface treatment process, the frame 16 is fitted with the liner 18 and runner 46. In the exemplary embodiment shown, the frame 16 is configured to be received completely within the liner 18. In this regard, the liner 18 encloses the frame 16 and functions as a barrier to prevent sealant from getting on the frame 16 or passing through the frame 16, and more particularly through the voids 34 in the frame 16. As best shown in FIG. 1, the liner 18 is generally tubular in shape and extends between an open end 38 and a closed end 40 to define an internal pocket 42 (see FIG. 3B), similar to that of a pillow case, for example. The liner 18 may be formed from a tubular sheet of elastic polyethylene resin, such as for example ethylene vinyl acetate (EVA), metallocene or other suitable materials, and may be produced by blown film extrusion or any other suitable process known in the art. The thin construction of the liner 18 may match the thin frame 16 and be dimensioned accordingly to cover the frame 16. In this regard, the liner 18 is configured as a thin sleeve to receive the frame 16 therein. The fit of the liner 18 to the frame 16 is a relatively tight fit such that there is little to no "slop" or loose liner 18 material extending from the frame 16. As will become more clear below, this relatively tight fit between the liner 18 and the frame 16 prevents the liner 18 from contacting the ground or other surfaces that might tear the liner 18.

In one embodiment, the liner 18 may be disposable and only suitable for single use or a limited number of uses before being thrown out. For example, the liner 18 may be disposed of after the completion of each surface treatment job. In an alternative embodiment, the liner 18 may be reusable for multiple surface treatment jobs. In either case, to attach the liner 18 to the frame 16, the tether 20 is uncoupled from the frame 16 so that the frame 16 may be received through the open end 38 of the liner 18 until the frame 16 is positioned entirely within the pocket 42 of the liner 18. When so positioned, as shown in FIG. 1, the tether 20 may be recoupled to the frame 16, as will be described in further detail below. As shown, the liner 18 wraps around and encloses the frame 16 to create a protective barrier to block any sealant 12 overspray from passing through the frame 16 during the traffic surface treatment process.

With continued reference to FIG. 1, the liner 18 may be removably coupled to the frame 16 with one or more clips 44 configured to attach to the first horizontal member 24, second horizontal member 26, and/or the plurality of vertical members 28. As shown, the clips 44 attach to the frame 16, about a perimeter thereof, and hold the liner 18 against corresponding frame 16 members 24, 26, 28 to prevent the liner 18 from sliding off the frame 16 during use. The clips 44 may be a U-shaped tube clamp, conduit clip, pipe clip, or other suitable structure for use with PVC or other piping, for example. In another embodiment, the liner 18 may be clipped to the first side 30 or the second side 32 of the frame 16. In this embodiment, the liner 18 may be sized to cover the entire first or second side 30, 32 of the frame 16.

Figure 3A:
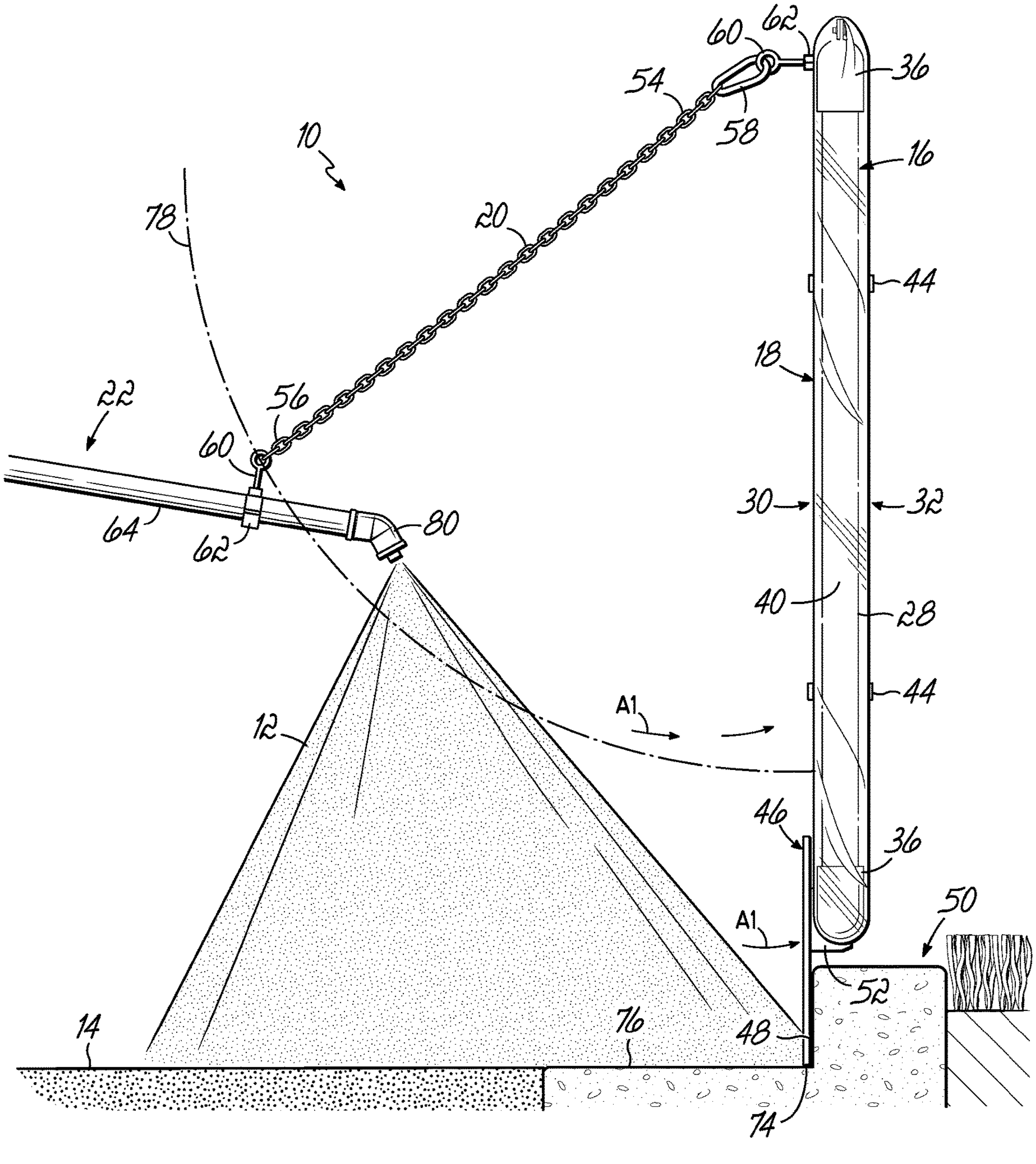
FIGS. 3A and 3B are side views of the masking shield shown in FIG. 1, illustrating the masking shield in use and positioned adjacent to a traffic surface to be coated with a protective sealant and a curb desired to be shielded from sealant overspray.

In the exemplary embodiment shown, the masking shield 10 further includes a removable runner 46 removably coupled to the second horizontal member 26. The runner 46 extends downwardly from the frame 16 and forms a thin sliding edge 74 to the frame 16 for preventing overspray from coming under the frame 16. As described in further detail below, the runner 46 further shields any surface or object that might be located beneath and behind the masking shield 10 from sealant 12 overspray. The runner 46 also functions as a guide that may assist with directing or maneuvering the masking shield 10 during use. The runner 46 may be formed from any suitable material such as acrylic, acrylic glass, plexiglass, sheet metal, or other suitable materials. As shown, the runner 46 is generally rectangular in shape with an elongate length similar to a length of the second horizontal member 26 and frame 16 generally. As shown in FIG. 3A, the runner 46 may have a height that is greater than the average height of a front face 48 of a finished curb 50. That way, the runner 46 shields the front face 48 and remainder of the curb 50 while the frame 16 of the masking shield 10 is positioned above the curb 50 to be maneuvered therealong, as will be described in additional detail below.

Figure 2:
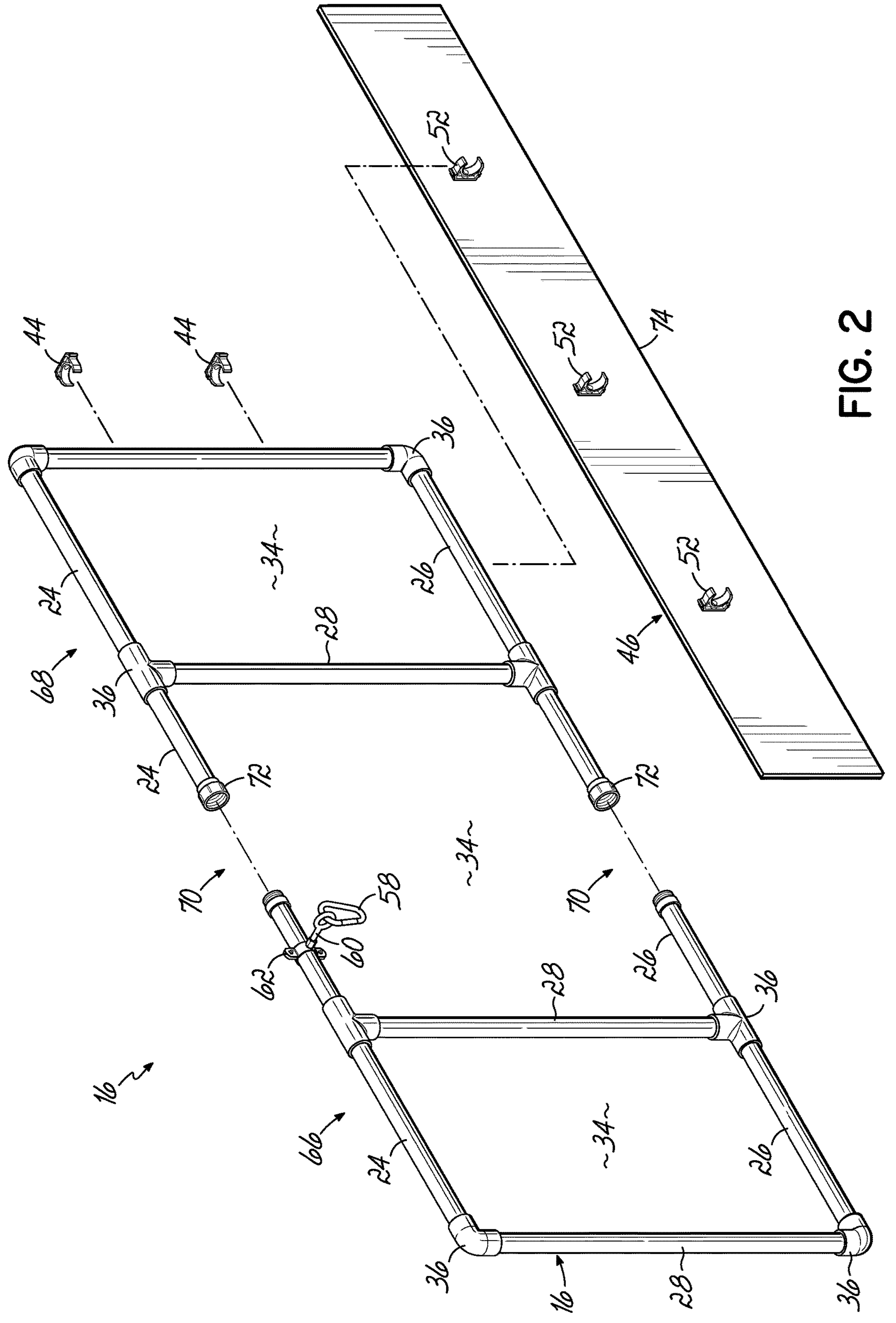
FIG. 2 is a partial disassembled view of the masking shield shown in FIG. 1.

As shown in FIG. 2, the runner 46 includes a plurality of snap fittings 52 fixed to and spaced along the elongate length of the runner 46. The snap fittings 52 may be spaced apart along a center line of the elongate length of the runner 46 or, alternatively, offset from the center line. The snap fittings 52 may be offset to position most of the runner 46 along the front face 48 of the curb, as shown in FIG. 3A for example. In either case, the fittings 52 are fixed to the runner 46 and are configured to removably couple the runner 46 to the second horizontal member 26, which defines a base edge of the frame 16. To this end, the snap fittings 52 may be a U-shaped tube clamp, conduit clip, pipe clip, or other suitable structure for use with PVC or other piping.

As described above, the masking shield 10 is configured for use with a mechanical sprayer that includes at least a spray wand 22 for spraying the protective sealant 12 onto the traffic surface 14. While not shown, the mechanical spray device may further include a pump and sealant storage tank to which the spray wand may be fluidly connected to via a flexible hose. As shown in FIG. 1, the tether 20 is configured to operatively couple the spray wand 22 to the frame 16 to ensure the spray is shielded. As explained in further detail below, the tethered engagement between the spray wand 22 and the frame 16 ensures that the masking shield 10 and spray wand 22 move in tandem during a traffic surface treatment process. This engagement prevents the spray wand 22 from being moved too far away from the frame 16 in any direction. That way, the masking shield 10 maintains a position between the spray wand 22 and a surface or object desired to be shielded from sealant 12 overspray. In the exemplary embodiment shown, the tether 20 is a welded chain. However, the tether 20 may be formed from other suitable structures such as a plastic chain, wire, braided wire, cable, rope, or cord, for example.

As shown in FIG. 1, a first end 54 of the tether 20 is coupled to the frame 16 and a second end 56 of the tether 20 is configured to be coupled to the spray wand 22. As shown, the first end 54 of the tether 20 is coupled to the frame 16 at a midpoint along the first horizontal member 24. However, the first end 54 of the tether 20 may be coupled to the frame 16 at other locations along the first horizontal member 24. In an alternative embodiment, the first end 54 of the tether 20 may be coupled to a vertical member 28, for example. In any event, to couple the tether 20 to the frame 16, the first end 54 of the tether 20 may be fitted with a clip 58, such as a spring clip, threaded clip, carabiner clip, locking clip, shackle, or other similar structure configured to couple the first end 54 of the tether 20 to an eye bolt 60 located on the first horizontal member 24. The eye bolt 60 includes a threaded shank that is configured to threadably engage with a split ring hanger 62 coupled to the frame 16. In this regard, the eye bolt 60 may be unthreaded from the split ring hanger 62 to install or remove the liner 18 from the frame 16. Once the liner 18 is installed to the frame 16, the threaded shank of the eye bolt 60 may be pressed through the liner 18, thereby making a small puncture in the liner 18, so that the eye bolt 60 may then be threaded to the split ring hanger 62. As shown, the split ring hanger 62 may be coupled to the first horizontal member 24 such that the eye bolt 60 extends from the frame 16 to position the tether 20 adjacent to the first side 30 of the frame 16.

With continued reference to FIG. 1, the second end 56 of the tether 20 may be coupled to an eye bolt 60 having a threaded shank that is configured to threadably engage with a split ring hanger 62. In an alternative embodiment, the second end 56 of the tether 20 may have a clip connected between the second end 56 of the tether 20 and the eye bolt 60, similar to the first end 54 of the tether 20. In either case, the split ring hanger 62 to which the second end 56 of the tether 20 is attached is configured to couple to a neck 64 of the spray wand 22. The length of the tether 20 is sized to ensure the spray wand 22 cannot be extended forward of or rearward of an end of the masking shield 10 in order to prevent unshielded spraying. If the spray wand 22 is attempted to be moved too far in any direction, it will therefore pull the masking shield 10 in the desired direction.

Referring now to FIG. 2, the masking shield 10 is configured so that it may be disassembled into smaller components for easy transport between jobs. In this regard, the frame 16 may be disassembled into a first section 66 and a second section 68, for example. As shown, the first section 66 and second section 68 are removably coupled together at corresponding joints 70 located along the first horizontal member 24 and the second horizontal member 26. Each joint 70 may be located proximate to a midpoint along the corresponding first and second horizontal members 24, 26. To removably couple the first section 66 and second section 68 together at the joints 70, each joint 70 includes a union fitting 72, such as a flanged socket fitting, slip joint union fitting, or other suitable structure. In this regard, each union fitting 72 includes a male component coupled to the first and second horizontal members 24, 26 of the first section 66 of the frame 16, and a female component coupled to the first and second horizontal members 24, 26 of the second section 68 of the frame 16. The corresponding female and male components of each fitting 72 may be coupled together to couple the first section 66 and the second section 68 together to form the frame 16. Other coupling elements might also be used to couple the frame sections 66, 68 together.

With continued reference to FIG. 2, the first end 54 of the tether 20 may be uncoupled from the frame 16 by uncoupling the tether 20 from the clip 58 or by unthreading the eyebolt 60 from the split ring hanger 62, as described above. The runner 46 may also be uncoupled from the second horizontal member 26. To this end, the runner 46 may be a single piece or, alternatively, two pieces with each separate piece configured to couple to a corresponding first or second section 66, 68 of the frame 16. Each component described above may be disassembled and reassembled in a tool-less manner, for example. That is, the assembly and disassembly of the masking shield 10, as set forth above, may be done by hand.

Figure 3B:
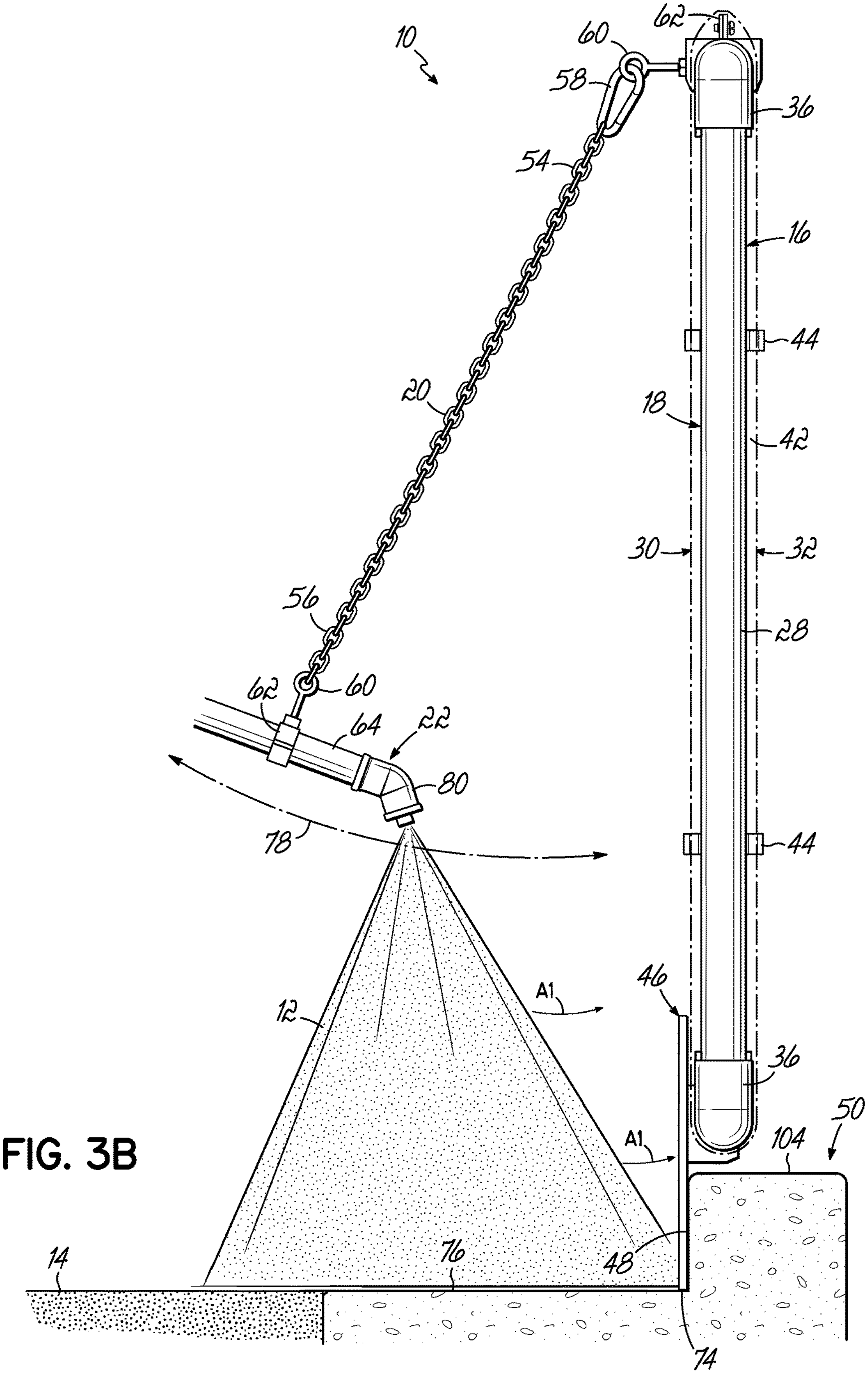

Turning now to FIGS. 3A and 3B, the masking shield 10 is shown in the upright position and adjacent to the traffic surface 14 to be coated with the protective sealant 12. The masking shield 10 is also adjacent to the finished curb 50 that is desired to be protected from any sealant 12 overspray, indicated by directional arrows A1, from the traffic surface treatment process. More particularly, the frame 16 of the masking shield 10 is positioned between the curb 50 and the sealant 12 as it is sprayed. To this end, the first side 30 of the frame 16 faces the traffic surface 14 and the second side 32 of the frame faces the curb 50. As described above, the runner 46 is positioned to cover the front face 48 of the curb 50 from any sealant 12 overspray A1. In this regard, the operator holding the masking shield 10 may align the edge 74 of the runner 46 along the traffic surface 14, and more particularly a form surface 76 of the curb 50, to guide the masking shield 10 therealong to shield the front face 48 and remainder of the finished curb 50 from sealant 12 overspray A1 during the traffic surface treatment process.

With continued reference to FIGS. 3A and 3B, the spray wand 22 is used to apply a swath of sealant 12 to a section of the traffic surface 14 during the traffic surface treatment process. During the traffic surface treatment process, a first operator holds the spray wand 22 a distance from the frame 16 of the masking shield 10 and applies the sealant 12 to the traffic surface 14. As shown, the tether 20 may be taut and angled relative to the first side 30 of the frame 16 during application of the sealant 12 to the traffic surface 14. To this end, the angle between the first side 30 of the frame 16 and the tether 20 may be between 10 and 80 degrees. In one embodiment, the angle may be between 60 and 80 degrees, for example.

As the first operator applies the sealant 12 to the traffic surface 14, a second operator holds the frame 16 of the masking shield 10 in the upright position, as shown in FIGS. 3A and 3B, to protect the curb 50 from sealant 12 overspray A1. The second operator may hold the masking shield 10 by gripping one or more of the frame members 24, 26, 28, such as the first horizontal frame member 24, for example. During the traffic surface treatment process, the first operator walks along the traffic surface 14, in a direction generally parallel to the curb 50, while applying the sealant 12 to the section of traffic surface 14. As the first operator walks along the traffic surface 14, the second operator walks in tandem while holding the frame 16 of the masking shield 10 in the upright position to protect at least the front face 48 of the curb 50 from sealant 12 overspray A1. In this regard, any sealant 12 overspray A1 is sprayed onto the runner 46 and liner 18 rather than the curb 50. In the disclosed embodiment of FIG. 3A, the spray wand 22 is tethered to the masking shield 10. However, the masking shield 10 may be used separated from the spray wand 22. In this regard, the holder of the masking shield 10 slides the shield 10 along the runner 46 which will usually rest on the traffic surface 14. The shield 10 is light, and easily carried by a person. However, to ensure that all overspray A1 is blocked, it may be desirable to rest the runner 46 on the ground surface and pull or glide the shield 10 along the ground. This prevents fatigue of the user as well. The smooth edge 74 of the runner 46 provides a tight fit against the ground to prevent overspray A1 from passing under the runner 46. The runner 46 can be made of a sufficiently slick material to promote sliding along an asphalt or concrete surface. Generally, runner 46 is dimensioned with sufficient spacing to allow the frame 16 to clear the curb 50. Fasteners 52, such as the illustrated clips 52 allow the runner 46 to be removably attached. The clips 52 are positioned on the runner 46 such that a majority of the runner 46 rests below the frame 16 to provide the clearance of the curb 50 as seen in FIGS. 3A and 3B. The runner 46 sits in front of the frame 16 to provide a blocking of face surface 48 that is generally co-planar with the front surface 30 of the frame 16 and liner 18.

With continued reference to FIGS. 3A and 3B, the tether 20 ensures that the first operator and second operator move in unison, and further ensures that appropriate spacing is maintained between the spray wand 22 and frame 16 of the masking shield 10. In this regard, the tether 20 ensures that the first operator does not move too far away from the frame 16 of the masking shield 10 by limiting the distance the spray wand 22 may be moved in any direction from the frame 16. For example, sealant 12 overspray A1 may contaminate the finished curb surface 50 should the first operator move too far ahead (i.e., in a direction further along the section of traffic surface) of the second operator to a position where the frame 16 is no longer positioned between the spray wand 22 and curb 50. To prevent this type of movement of the spray wand 22 relative to the frame 16, the tether 20 limits movement of part of the spray wand 22 to a movement area 78, as described in further detail below.

As shown in FIGS. 3A and 3B, the tether 20 limits movement of the spray wand 22, and more particularly a spray nozzle 80 of the spray wand 22, to the movement area 78 wherein the spray nozzle 80 of the spray wand 22 may be freely moved. In this regard, the spray nozzle 80 is permitted to move freely within the movement area 78, yet the spray nozzle 80 is prevented from moving outside of the movement area 78 by a length of the tether 20. The length of the tether 20 may be the distance between the first end 54 and second end 56 of the tether 20. In the embodiment shown, the length of the tether 20 may be in the range of two to six feet, for example. However, other lengths of the tether 20 are contemplated as being within the scope of the invention based on the size and length of the shield. The movement area 78 may be changed based on the length of the tether 20 and/or the location of the split ring hanger 62 along the neck 64 of the spray wand 22, for example. For example, the movement area 78 may be increased by having a tether 20 with a longer length. The movement area 78 may also be increased by moving the split ring hanger 62 up the neck 64 of the spray wand 22 thereby positioning the hanger 62 is a greater distance away from the nozzle 80. In one embodiment, the length of the tether 20 may correspond to the spray coverage area of the spray nozzle 80 and/or size of the frame 16. For example, a spray wand 22 having a nozzle 80 with a larger spray coverage area may require a tether 20 with a longer length. In another embodiment, the length of the tether 20 may be adjustable to change the movement area 78 and/or to accommodate for different spray wands 22 having different spray coverages.

As shown in FIGS. 3A and 3B, the tether 20 permits movement of the nozzle 80 of the spray wand 22 at least 90 degrees, and up to 180 degrees, about the first horizontal member 24 of the frame 16. In another embodiment, the tether 20 may permit movement of the nozzle 80 up to 340 degrees or more about the first horizontal member 24 and frame 16. However, the movement area 78 is not two-dimensional relative to the frame 16, rather, the movement area 78 is a three-dimensional dome-shaped region of space adjacent to the first side 30 of the frame 16. In this regard, a base of the dome-shaped movement area 78 is coplanar with the first side 30 of the frame 16. In the embodiment where the spray wand is movable 340 degrees or more about the first horizontal member 24, the movement area 78 may be more spherical in shape, with a center of the spherical movement area 78 located at the attachment point between the first end 54 of the tether 20 and the frame 16. In the embodiment shown, the spray nozzle 80 may be positioned anywhere within the dome-shaped movement area 78 and is prevented from being moved beyond the movement area 78, and away from the frame 16, by the length of the tether 20. To this end, a radius of the dome-shaped movement 78 area may be less than a height of the frame 16 (i.e., a distance between the first horizontal member 24 and second horizontal member 26). The radius of the dome-shaped movement area 78 may corresponding to the length of the tether 20. As a result of the tether 20 limiting movement of the spray wand nozzle 80 to within the movement area 78, the operator holding the spray wand 22 is prevented from moving the spray nozzle 80 too far ahead (or from falling too far behind) of movement of the frame 16 by the other operator, thereby shielding the curb 50 from any sealant 12 overspray A1.

With continued reference to FIGS. 3A and 3B, the tethered engagement between the spray wand 22 and frame 16 provides the spray wand 22, and more particularly the spray nozzle 80, with six degrees of freedom of mobility relative to the frame 16 and within the movement area 78. First, the tether 20 allows the spray wand 22 and nozzle 80 to move up and down relative to the frame 16. Second, the tether 20 allows the spray wand 22 and nozzle 80 to move forwards and backwards relative to the frame 16 (i.e., in a direction along the length of the frame 16). Third, the tether 20 allows spray wand 22 and nozzle 80 to move towards and away from the first side 30 of the frame 16. Fourth, the tether 20 allows the spray wand 22 and nozzle 80 to swivel left and right relative to the frame 16 (i.e., yawing). Fifth, the tether 20 allows the spray wand 22 and nozzle 80 to tilt forwards and backwards relative to the frame 16 (i.e., pitching), and sixth, the tether 20 allows the spray wand 22 and nozzle 80 to pivot side to side relative to the frame 16 (i.e., rolling). Thus, the tether 20 allows for maximum mobility of the spray wand 22 and spray nozzle 80 within the movement area 78 so that the first operator may effectively apply the sealant 12 to the traffic surface 14.

Upon completion of the traffic surface treatment process, the masking shield 10 may be disassembled for storage or to be moved to the next job location. In this regard, an operator first uncouples the runner 46 and the tether 20 from the masking shield 10. In this regard, the tether 20 may be removed by unclipping clip 58 from eye bolt 60, for example. In this same step, the eye bolt 60 may be uncoupled from the split ring hanger 62 located on the frame 16. The second end 56 of the tether 20 may also be uncoupled from the spray wand 22 by removing the split ring hanger 62 therefrom, for example. In any event, once the tether 20 is uncoupled from the masking shield 10, the frame 16 may be removed from the liner 18. This step may involve removing clips 44 that secure the liner 18 to the frame 16. Once the liner 18 is freed from the frame 16, the liner 18 may be slid off the frame 16 and disposed of or saved for another job. After the liner 18 is removed from the frame 16, the frame 16 may be further disassembled into the first and second sections 66, 68 by uncoupling the frame 16 at joints 70. To this end, all the components of the masking shield 10 may be disassembled to be stored in a relatively compact manner.

Figure 4:
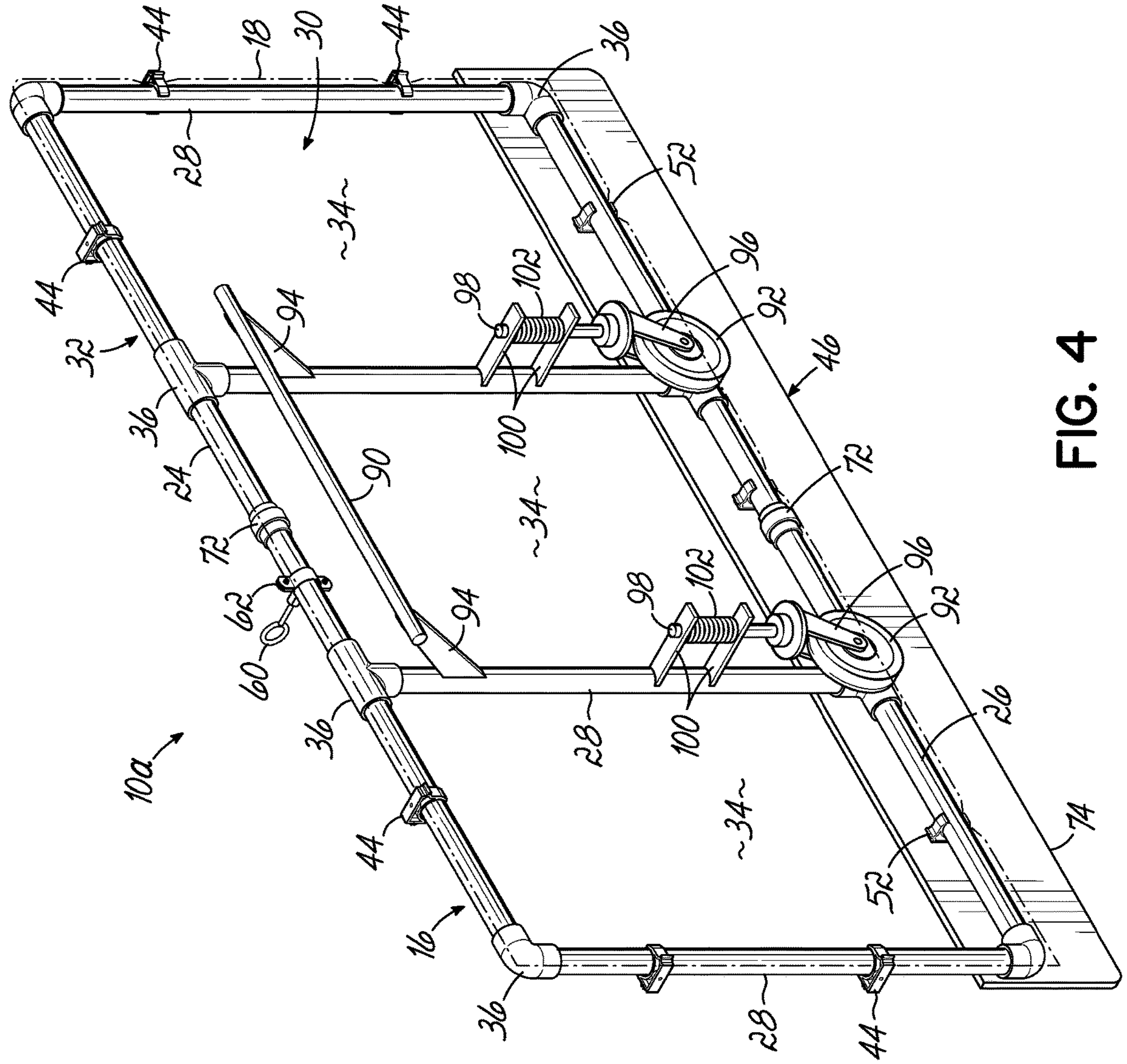
FIG. 4 is a perspective view of a masking shield according to another embodiment of the invention.
Figure 5:
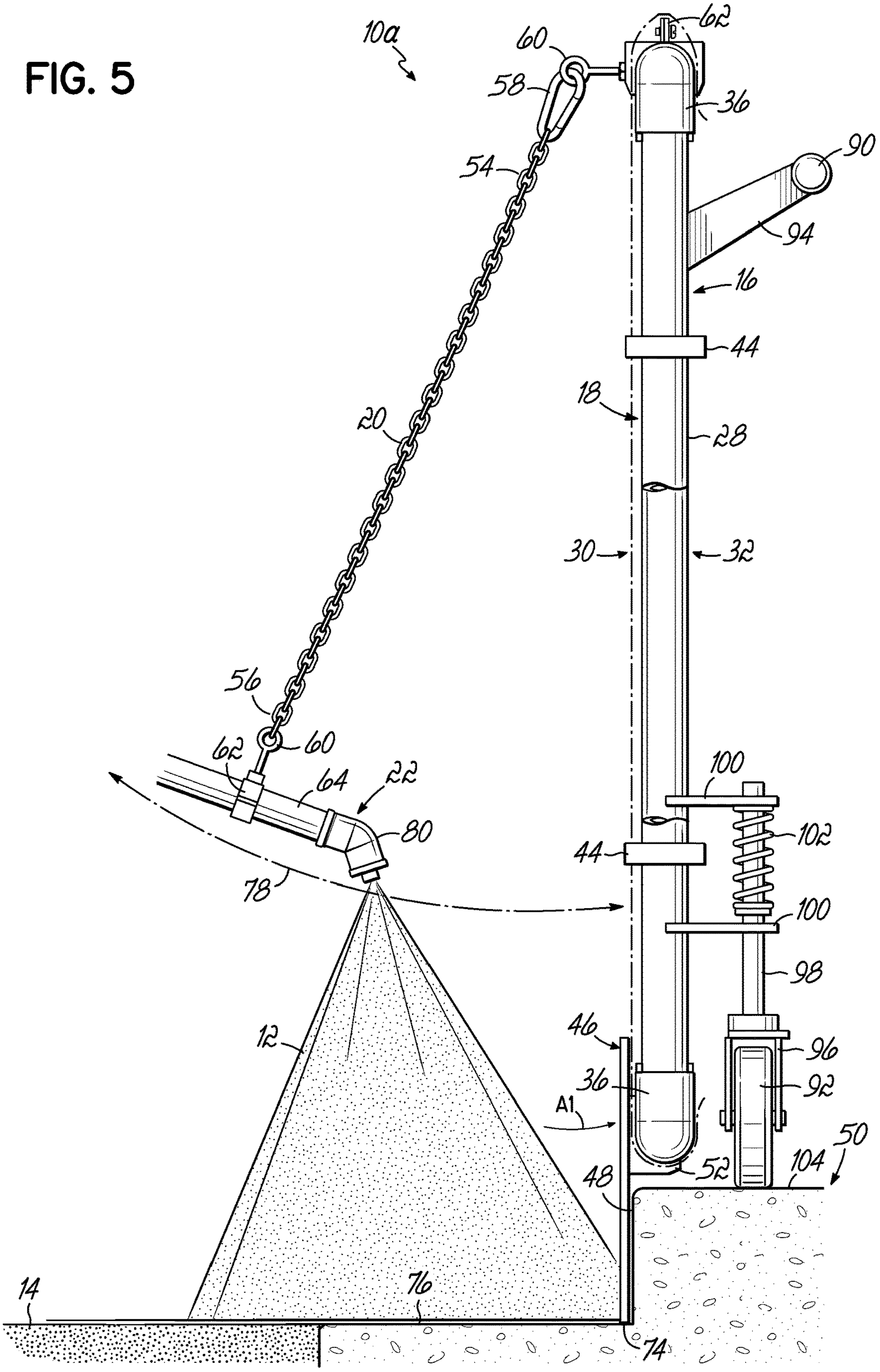
FIG. 5 is a side view of the masking shield shown in FIG. 4, illustrating the masking shield positioned adjacent to a curb and a traffic surface to be coated with a protective sealant.

Turning now to FIGS. 4 and 5, wherein like numerals represent like features, an exemplary masking shield 10*a* is shown in accordance with another embodiment of the present invention. The primary differences between the masking shield 10*a* of this embodiment and the masking shield 10 of the previously described embodiment is that the frame 16 further includes a handle 90 and two spaced apart wheels 92 for guiding the masking shield 10*a* along the curb 50. The tether 20 is removed from the masking shield 10*a* in FIG. 4 for clarity purposes, but is shown in FIG. 5.

With continued reference to FIGS. 4 and 5, the frame 16 of the masking shield 10*a* includes the handle 90 which may be grasped an operator for maneuvering the frame 16 during the traffic surface treatment process. As shown, the handle 90 is located on the second side 32 of the frame 16, opposite from the first side 30 where the tether 20 and spray wand 22 are located. That way, the operator holding and maneuvering the masking shield 10*a* is standing behind the masking shield 10*a* and out of the way of the spray wand 22 during the traffic surface treatment process. As best shown in FIG. 4, the handle 90 is coupled to and extends between two supports 94. More particularly, each support 94 is coupled to a corresponding vertical member 28 that is centrally located on the frame 16 such that the handle 90 extends between the two vertical members 28. The supports 94 are configured to position the handle 90 a distance away from the second side 32 of the frame 16 and near the first horizontal member 24. To this end, the handle 90 is positioned over the wheels 92 so that the operator can better guide the masking shield 10 along the curb 50, as described in further detail below. In one embodiment, the handle 90 may be positioned closer to the second horizontal member 26 than the first horizontal member 24. The supports 94 may be coupled to the vertical members 28 by using an angled fitting, welding, bolting, or other similar structures or means.

With continued reference to FIG. 4, the frame 16 further includes two spaced apart wheels 92 located on the second side 32 of the frame 16, with each wheel 92 attached to and supported by a corresponding vertical member 28. The wheels 92 may be attached to the same vertical members 28 to which the handle 90 is attached, for example. The wheels 92 are centrally located on the second side 32 of the frame 16 to best support the weight of the frame 16 and masking shield 10*a*. As shown, each wheel 92 is rotatably coupled to a fork 96 having a fork stem 98. Each wheel 92 may be coupled to each fork 96 with an axle, for example. Each fork stem 98 is coupled to the corresponding vertical member 28 with one or more horizontally positioned supports 100. Each fork stem 98 is pivotably coupled to each corresponding support 100 so that each wheel 92 may pivot or swivel relative to the corresponding supports 100. That way, the wheels 92 may change directions as needed during use. To this end, each wheel 92 may be similar to a swivel caster wheel, for example. The fork stem 98 of each wheel 92 may be fitted with a coil spring 102. As shown, each coil spring 102 may be positioned on each corresponding fork stem 98 and between the corresponding supports 100. The coil springs 102 provide the masking shield 10*a* the ability to accommodate different curb 50 heights as well as accommodate for uneven conditions of the curb 50 or other surface, for example.

As shown in FIG. 5, the supports 100 are configured to space each corresponding wheel 92 a lateral distance away from the second side 32 of the frame 16 so that each wheel 92 may engage with a top surface 104 of the curb 50, as shown in FIG. 5. Furthermore, the supports 100 may be spaced a distance axially along each corresponding vertical member 28 and away from the second horizontal member 26 to thereby position each wheel 92 a distance above the ground. The distance that each wheel 92 is positioned above the ground may correspond to the height of a front face 106 of the curb 50, for example. As described above, the coil springs 102 allow for some additional height adjustability of each wheel 92. For example, as each spring 102 is compressed, the fork stem 98 of each wheel 92 is received upwardly through the supports 100 thereby raising each wheel 92 an additional distance above the ground.

As shown in FIG. 5, the wheels 92 are configured to engage with and move along the top surface 104 of the curb 50 during the traffic surface treatment process. In this regard, the operator holding the masking shield 10*a* may use the handle 90 to engage the wheels 92 with the curb 50 and walk the masking shield 10*a* along the curb 50. As shown, the supports 100 are configured to space each wheel 92 a distance away from the second side 32 of the frame 16 so that the wheels 92 may engage with the top surface 104 of the curb 50. This spacing allows the frame 16 and runner 46 to cover and to glide along the front face 48 and form surface 76 of the curb 50. In this regard, the axial spacing of the supports 100 along each vertical member 28 is configured so that the runner 46 is positioned in contact with the form surface 76 of the curb 50 to protect the front face 48 and remainder of the curb 50 from sealant 12 overspray A1. More particularly, the runner 46 is positioned close to and in a near-abutting relationship with the front face 48 of the curb 50. Thus, as the operator moves the masking shield 10*a* along the curb 50, the runner 46 glides along the ground to shield the front face 48 and remainder of the curb 50 from sealant 12 overspray A1. The runner 46 may be slightly offset in a downward direction relative to the second horizontal member 26 of the frame 16, as shown in FIG. 5. In an alternative embodiment, the runner 46 may be centered on the second horizontal member 26 of the frame 16.

Figure 6:
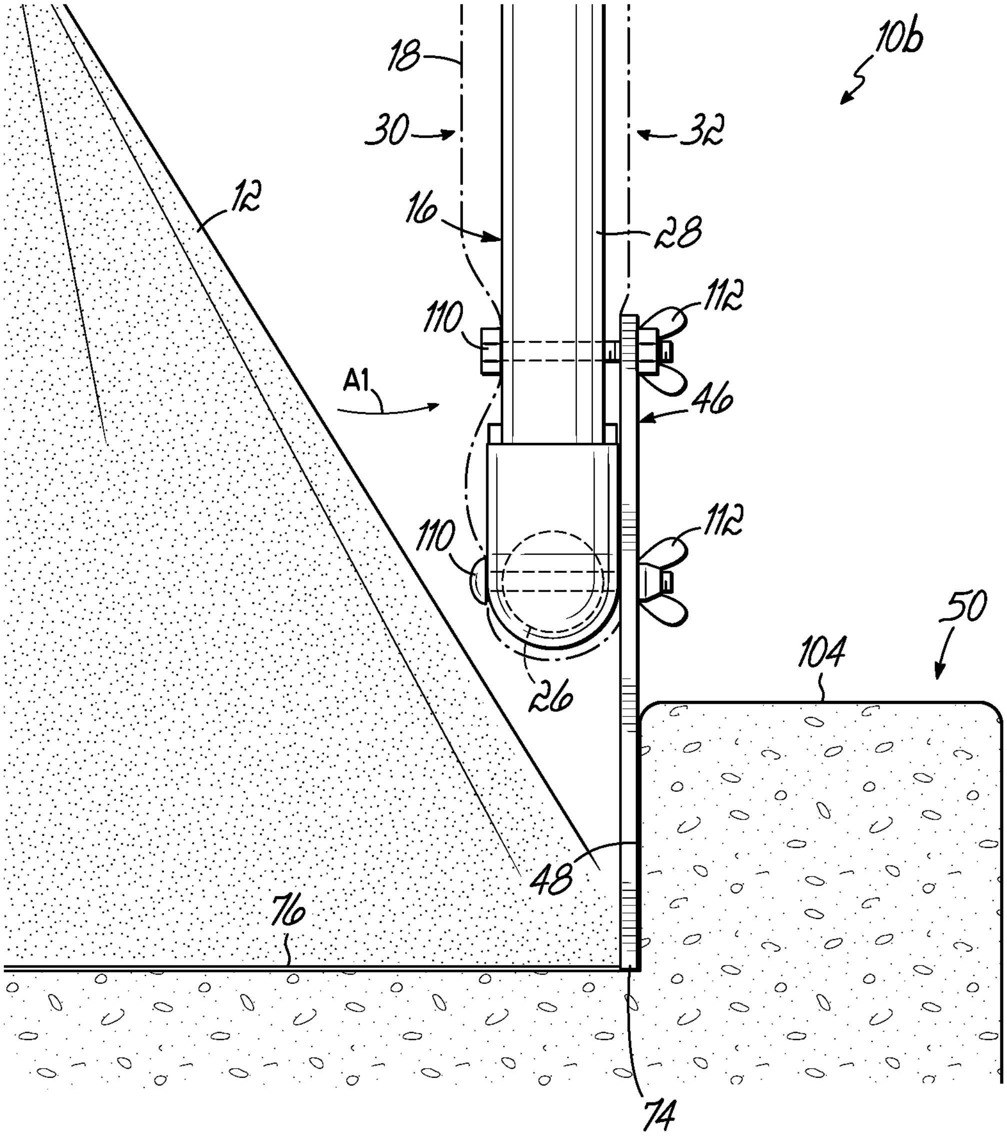
FIG. 6 is an enlarged side view of a masking shield that includes a runner according to another embodiment of the invention.

Turning now to FIG. 6, wherein like numerals represent like features, an exemplary masking shield 10*b* is shown in accordance with another embodiment of the present invention. The primary difference between the masking shield 10*a* of this embodiment and the masking shields 10, 10*a* of the previously described embodiments is that the runner 46 and the frame 16 include a plurality of corresponding apertures configured to receive bolt 110 and nut 112 combinations for removably coupling the runner 46 to the frame 16. The bolt 110 and nut 112 combinations may be used in addition to or replace the fittings 52 of the masking shield 10 described with respect to FIGS. 1-3B or the fittings 52 of the masking shield 10*a* described with respect to FIGS. 4-5, for example.

In the exemplary embodiment shown in FIG. 6, the runner 46 is removably coupled to the second side 32 of the frame 16. That way, when the runner 46 is positioned against the front face 48 of the curb 50, as shown, the frame 16 is positioned over the form surface 76 of the curb 50. To couple the runner 46 to the frame 16, the plurality of bolt 110 and nut 112 combinations are installed through the corresponding apertures in the runner 46 and frame 16. More particularly, one bolt 110 may be positioned through the runner 46 and each vertical member 28 of the frame 16. One or more bolts 110 may also be positioned through the runner 46 and the second horizontal member 26 of the frame 16. For example, one bolt 110 may be installed through the runner 46 and the second horizontal member 26 adjacent to one end of the frame 16 while a second bolt 110 is installed through the runner 46 and the second horizontal member 26 adjacent to an opposite end of the frame 16. However, fewer or more bolt 110 and nut 112 combinations may be used to couple the runner 46 to the frame 16 as desired.

To install the runner 46 of this embodiment to the frame 16, the liner 18 is first installed over the frame 16. Once the liner 18 is installed to the frame 16, the runner 46 is positioned on the second side 32 of the frame 16 to align the corresponding apertures so that bolts 110 may be received through the aligned apertures. In this regard, each bolt 110 is pressed through the liner 18, thereby making a small puncture in the liner 18 on each side of the frame 16 so that the nut 112 may then be threaded to the end of the bolt 110. This process is repeated for each set of aligned apertures until the runner 46 is securely attached to the frame 16, as shown in FIG. 6. To remove the runner 46, the bolt 110 and nut 112 combinations may be uninstalled to uncouple the runner 46 from the frame 16. To facilitate installation and removal of the runner 46, the nuts 112 may be wingnuts, for example. However, other types of fastening structures are within the scope of the invention, such as a bolt and hex nut or square nut combination or a pin bolt combination, for example.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A masking shield for shielding a surface during a traffic surface treatment process during which a mechanical sprayer having a spray wand is used to spray a protective sealant on the traffic surface, comprising:

a frame, having a generally rectangular shape with horizontal members defining a top and a bottom and vertical members, the frame defining a first side and a second side;

the frame including multiple sections coupled with each other at joints in the respective horizontal members for forming the frame;

a thin, flexible liner in the form of a sleeve, the sleeve configured to completely receive the frame; and a runner removably coupled to a bottom edge of the frame for sliding the frame and flexible liner along a surface while the surface is sprayed.

2. The masking shield of claim 1, wherein the liner is a disposable liner.

3. The masking shield of claim 1, wherein the runner is an elongated rectangular piece that extends a length of the frame and further extends a distance from the bottom edge of the frame.

4. The masking shield of claim 1, wherein the runner includes one or more clips for coupling the runner to the bottom edge of the frame.

5. The masking shield of claim 1, wherein the runner is removably coupled to the frame using one or more nut and bolt combinations.

6. The masking shield of claim 1, further comprising a tether with a first end coupled to the frame and a second end being configured to couple to the spray wand such that a spray nozzle of the spray wand is permitted to move freely within a movement area relative to the frame, wherein the spray nozzle is prevented from moving out of the movement area by a length of the tether.

7. The masking shield of claim 6, wherein the tether is removably attached to the frame.

8. The masking shield of claim 6, wherein the tether is attached to at least one of the horizontal members of the frame.

9. The masking shield of claim 6, wherein the tether is located on the first side of the frame.

10. The masking shield of claim 6, wherein the movement area is located adjacent to the first side of the frame.

11. The masking shield of claim 6, wherein the movement area is a dome-shaped sphere.

12. The masking shield of claim 1, further comprising a plurality of clips for securing the liner to the frame.

13. The masking shield of claim 1, further comprising a handle positioned on the second side of the frame.

14. The masking shield of claim 13, wherein the vertical members include a first vertical member and a second vertical member and the handle extends between the first vertical member and the second vertical member of the frame.

15. The masking shield of claim 1, further comprising a first wheel and a second wheel located on the second side of the frame.

16. The masking shield of claim 15, wherein the vertical members include a first vertical member and a second vertical member and the first wheel is mounted to the first vertical member of the frame and the second wheel is mounted to the second vertical member of the frame.

17. A masking shield, for shielding a surface during a surface treatment process during which a sprayer is used to spray a protective material on a surface, comprising:

a frame, having a generally rectangular shape with horizontal members defining a top and a bottom and vertical members, the frame defining a first side and a second side;

a handle positioned on at least one member of the frame for manipulating and moving the frame along a surface;

a thin, flexible liner in the form of a sleeve, the sleeve configured to completely receive the frame; and a runner removably coupled to a bottom edge of the frame for sliding the frame and flexible liner along a surface while the surface is sprayed.

18. The masking shield of claim 17, further comprising a tether having a first end coupled to the frame and a second end being configured to couple to a spray wand that is used to apply a protective coating to the traffic surface during a surface treatment process such that a spray nozzle of the spray wand is permitted to move freely within a movement area relative to the frame, wherein the spray nozzle is prevented from moving out of the movement area by a length of the tether.

19. A masking shield for shielding a surface during a surface treatment process during which a sprayer is used to spray a protective material on a surface, comprising:

a frame, having a generally rectangular shape with horizontal members defining a top and a bottom and vertical members, the frame defining a first side and a second side;

the frame including multiple sections coupled with each other at joints for forming the frame;

a thin, flexible liner in the form of a sleeve, the sleeve configured to completely receive the frame; and a runner removably coupled to a bottom edge of the frame for sliding the frame and flexible liner along a surface while the surface is sprayed;

the runner being removably coupled to the frame using one or more nut and bolt fastener combinations.

* * * * *